Patented July 13, 1954

2,683,720

UNITED STATES PATENT OFFICE 2,683,720

PROCESS FOR THE PREPARATION OF 6 - NITRO - COUMARIN - 3 - CARBOXYLIC ACID

Albert Schlesinger, Nathan Weiner, and Samuel M. Gordon, Queens County, N. Y., assignors to Endo Products, Inc., Richmond Hill, N. Y., a corporation of New York No Drawing. Application December 15, 1949, Serial No. 133,212

2 Claims. (Cl. 260—343.2)

This invention relates to and has for its object the provision of—(a) esters and amides of the compounds of substituted coumarin-3-carboxylic acids; (b) the salts thereof; and (c) processes for preparation of the foregoing.

These compounds are promising therapeutic agents, especially in respect of their activities as analgesics and central depressants ranging in action from mild sedation to deep hypnosis.

The term coumarin-3-carboxylic acids is used herein to designate the class of compounds having the general formula—

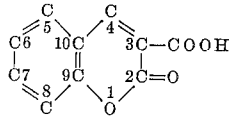

This invention comprises especially compounds of the formula—

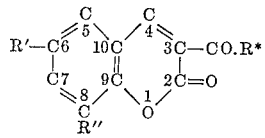

wherein:

R' and R'' represents hydrogen, or a halogen such as chlorine, bromine or the like, or the nitro group $NO_2$, or an amino group $NH_2$, or an alkoxy group, as for example methoxy, or an alkylene group such as allyl, but only one of them may be hydrogen at any one time.

R* is OX, NHX or $NX_2$ wherein X is alkyl, arylalkyl, alkyl amino alkyl, dialkyl amino alkyl, aryl alkyl-alkyl amino alkyl.

The substituted coumarin-3-carboxylic acid derivatives were prepared, in general, by starting with the corresponding substituted salicylaldehyde as the nucleus containing the substituents R' or R'', or both, as the case may be. For example, by interacting the 3-hydroxy-5-bromo benzaldehyde and cyano acetic acid (or an alkali salt thereof) there was obtained as the ultimate product the 6-bromo coumarin-3-carboxylic acid.

An alternative method of preparation is the direct introduction of the substituent in the coumarin-3-carboxylic acid. For example, by treatment of the coumarin-3-carboxylic acid with nitric acid there was obtained the 6-nitro coumarin-3-carboxylic acid. An alternative method of preparation resides in modification of the substituents in the amides or esters; for example the treatment of 6-nitro 3-carboxylic acid ethanolamine ester with catalytic reduction results in the formation of the corresponding 6-amino compound.

The interaction of the 2-hydroxy 5-bromo benzaldehyde with sodium cyano acetate results in the formation of the condensation product having the formula

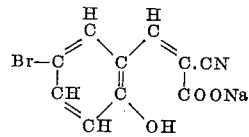

On acid hydrolysis the foregoing nitrile is converted into the corresponding carboxylic acid with resultant closing of the ring through the elimination of a molecule of water derived from the hydrogen of the hydroxy group attached to the benzene ring and the hydroxy group of the acetic acid carboxyl group.

PREPARATION 1.—6-BROMO-COUMARIN-3-CARBOXYLIC ACID 380 grams of 5-bromo-salicylaldehyde (1.9 moles) were dissolved in 800 cc. of 10% sodium hydroxide solution, 1000 cc. of water added and the mass warmed to 40° C. The clear solution was stirred and 1.25 liters of freshly prepared sodium cyano acetate solution (2.65 moles) were added. The whole mixture was heated at 40° C. for 5 minutes on the water bath, then left at room temperature for 12 hours. The alkaline solution was acidified to Congo red with concentrated hydrochloric acid, and sufficient additional concentrated hydrochloric acid to give a 4% hydrochloric acid solution (about 600 cc.) was added. The mixture of the precipitated 2-hydroxy-5-brom-beta-phenyl-alpha-cyano-acrylic-acid was heated for 2 hours at 75–85° C. and then for 2 minutes at 95–100° C. After cooling, the 6-bromo-coumarin-3-carboxylic acid was filtered on a Buchner funnel, washed three times with 100 cc. of cold water and 5 times with 60 cc. of cold ethanol, and finally with 50 cc. of ether. There was obtained a yield of 303 grams (60%). The melting point of the product from 95% ethanol was 200° C.

PREPARATION 2.—6,8-DIBROMCOUMARIN-3-CARBOXYLIC-ACID

In accordance with the general procedure set forth in Preparation 1 there was prepared the 6,8 - dibromcoumarin - 3 - carboxylic acid except that the 3,5-dibromsalicylaldehyde was used as the initial starting material for interaction with the sodium cyano acetate. The product was obtained in a 65% yield and has a melting point of 224–225° C. when recovered from ethanol.

PREPARATION 3.—8-METHOXY-COUMARIN-3-CARBOXYLIC ACID

In accordance with the general method of procedure described in Preparation 1 there was obtained the 8 - methoxy - coumarin - 3 - carboxylic acid except that 3 methoxy salicylaldehyde was used as the initial starting material for interaction with the sodium cyano acetate solution. The yield obtained was 69%. The product has a melting point of 215° C. when recovered from acetone and water.

PREPARATION 4.—8-ALLYL-COUMARIN-3-CARBOXYLIC ACID

This product was prepared in accordance with the general method described in Preparation 1 except that 3-allylsalicylaldehyde was used as the initial starting material for interaction with the sodium cyano acetate solution. The yield obtained was 40%. The product has a melting point of 147° C. when recovered from acetone and water.

PREPARATION 5.—6-NITRO-COUMARIN-3-CARBOXYLIC ACID

To 150 cc. of fuming nitric acid (sp. gr. 1.5) in a one liter flash cooled in an ice bath, 114 grams of coumarin-3-carboxylic acid (0.6 mole) were introduced with stirring. After all of the latter acid was added the flask was left at room temperature for two hours. The mixture was then heated on the water bath for 30 minutes at 80° C. The clear solution was cooled in an ice bath and one liter of ice water added with stirring. The precipitated 6-nitro-coumarin-3-carboxylic acid was filtered on a Buchner funnel, washed with water until the filtrate was neutral against Congo paper and dried in vacuum. There was obtained 141 grams (yield 100%). It has a melting point of 236° C. when recovered from dioxane and water.

*Example 1.—6-brom-coumarin-3-carboxylic-diethylamino-ethanol ester*

5.85 grams of diethylamino ethanol (0.05 mole), $Et_2N.C_2H_4OH$, where dissolved in 100 cc. of dry benzene and added quickly with stirring to 14.3 grams (0.05 mole) of 6-brom-coumarin-3-carboxylic acid chloride suspended in 100 cc. of dry benzene. The mixture was then refluxed for 4 hours. After cooling the precipitated hydrochloride of the ester was filtered on a Buchner funnel, washed with hexane and dried in vacuum. It was obtained in a yield of 17.2 grams (85%) and has a melting point of 215° C. when recovered from alcohol.

The ester base was recrystallized from 50% acetone and has a melting point of 115° C.

*Example 2.—6-brom-coumarin-3-carboxylic-diethylamino-n.propanol ester*

This compound was prepared in accordance with the general method described in Example 1 except that diethylamino n-propanol $$Et_2N.CH_2.CH_2CH_2OH$$

was used as the initial starting material for interaction with the 6-brom-coumarin-3-carboxylic acid chloride. The hydrochloride salt thereof has a melting point of 221° C. when recovered from absolute ethanol. It was obtained in a yield of 80%.

The base has a melting point of 105° C. when recovered from 50% acetone.

*Example 3.—6-brom-coumarin-3-carboxylic-di n.butylamino propanol ester*

This compound was prepared in accordance with the general method described in Example 1 except that di-n.butyl amino propanol $$(n.Bu)_2NCH_2CH_2CH_2OH$$

was used as the initial starting material for interaction with the 6-brom-coumarin-3-carboxylic acid chloride. The hydrochloride salt thereof has a melting point of 135° C. when recovered from benzol and hexane. It was obtained in a yield of 79%.

The base has a melting point of 105° C. when recovered from 50% acetone.

*Example 4.—6-brom-coumarin-3-carboxylic-dibenzylamino ethanol ester*

This compound was prepared in accordance with the general method described in Example 1 except that dibenzyl ethanolamine $$(C_6H_5.CH_2)_2.NCH_2CH_2OH$$

was used as the initial starting material for interaction with the 6-brom-coumarin-3-carboxylic acid chloride. The hydrochloride salt thereof has a melting point of 197° C. when recovered from 50% ethanol. It was obtained in a yield of 92%.

The base has a melting point of 145° C. when recovered from acetone.

*Example 5.—6-brom-coumarin-3-carboxylic di (2-ethyl-hexyl) amino ethanol ester*

This compound was prepared in accordance with the general method described in Example 1 except that di (2-ethyl-hexyl) amino ethanol $$(CH_3(CH_2)_3CH.CH_2)_2N.CH_2CH_2OH$$
$$\phantom{xxxxxxxxxx}|$$
$$\phantom{xxxxxxxxxx}C_2H_5$$

was used as the initial starting material for interaction with the 6-brom-coumarin-3-carboxylic acid chloride. The hydrochloride salt thereof has a melting point of 105° C. when recovered from benzol and hexane. It was obtained in a yield of 78%.

*Example 6.—6-brom-coumarin-3-carboxylic-ethylamino ethanol ester*

4.5 grams of monoethylamino ethanol (0.05 mole), $(C_2H_5)HN.CH_2CH_2OH$, were dissolved in 30 cc. of chloroform in a 500 cc. round bottomed flask. The solution was saturated with dry hydrogen chloride while cooling with ice. 14.4 grams (0.05 mole) of 6-brom-coumarin-3-carboxylic acid chloride in 30 cc. of chloroform were added and the flask was stoppered, wired and heated for 72 hours at 40–45° C. After cooling in ice the flask was opened and 150 cc. of hexane added. The hydrochloride salt of the ester was filtered on a Buchner funnel, washed with 20 cc. of hexane and dried in vacuum. The product was obtained in a yield of 9.5 grams (50%) and has a melting point of 205.5° C. when recovered from ethanol and water.

*Example 7.—6-brom-coumarin-3-carboxylic-n.butyl amino ethanol ester*

This product was prepared in accordance with the procedure of Example 6 except that n.butyl amino ethanol, $(C_4H_9)HN.CH_2CH_2OH$, was used as the initial starting material for interaction with the 6-brom-coumarin-3-carboxylic acid chloride. The hydrochloride salt was obtained in a yield of 51% and has a melting point of 183° C. when recovered from alcohol.

*Example 8.—6-amino coumarin-3-carboxylic diethylamino ethylester*

11.1 grams of 6-nitro coumarin-3-carboxylic diethyl amino ethanol ester hydrochloride was suspended in 200 cc. of 95% ethanol and hydrogenated in the presence of 0.2 gram of charcoal paladium catalyst with 36 pounds of initial pressure. After two hours the quantitative amount of hydrogen was absorbed. 25 cc. of water was then added and heated to boiling temperature and filtered while hot. After cooling the hydrochloride salt of the product precipitated.

It was obtained in a yield of 50% and has a melting point of 210° C. when recovered from 85% alcohol.

*Example 9.—6,8 dibrom-coumarin-3-carboxylic dimethylamino ethanol ester*

This product was prepared in accordance with the general procedure of Example 1, using dimethyl amino ethanol, $(CH_3)_2N.CH_2CH_2OH$ and the 6,8 dibrom-coumarin-3-carboxylic acid chloride as the initial starting materials.

The hydrochloride salt of the product was obtained in a yield of 60% and has a melting point of 235° C. when recovered from alcohol.

*Example 10.—6,8 dibrom-coumarin-3-carboxylic-diethylamino ethanolester*

This product was prepared in accordance with the general procedure described in Example 9, except that the diethylamino ethanol was used in place of the dimethylamino alcohol as the initial starting material for interaction with the 6,8 di-brom-coumarin-3-carboxylic acid chloride.

The hydrochloride salt of the product was obtained in a yield of 60% and has a melting point of 191° C. when recovered from alcohol.

*Example 11.—6,8 dibrom-coumarin-3-carboxylic-diethylamino propanol*

This product was prepared in accordance with the general method of procedure described in Example 9, except that diethylamino propanol, $Et_2N.CH_2CH_2CH_2OH$, was used as the initial starting material for interaction with the 6,8 dibrom-coumarin-3-carboxylic acid chloride.

The hydrochloride salt of the product was obtained in a yield of 66% and has a melting point of 186.5° C. when recovered from ethanol.

*Example 12.—6,8 dibrom-coumarin-3-carboxylic diethylamino 2-pentanol ester*

This product was prepared in accordance with the general method of procedure described in Example 9, except that 5-diethylamino 2-pentanol, $Et_2N.CH_2CH_2CH_2CHOH.CH_3$, was used as the initial starting material for interaction with the 6,8 dibrom-coumarin-3-carboxylic acid chloride.

The hydrochloride salt of the product was obtained in a yield of 77% and has a melting point of 121° C. when recovered from ethanol and ether.

*Example 13.—6,8 dibrom-coumarin-3-carboxylic-dibenzylamino ethanolester*

This product was prepared in accordance with the general procedure described in Example 9, using dibenzylamino ethanol, $(C_6H_5.CH_2)_2N.CH_2CH_2OH$ as the initial starting material for interaction with the 6,8 dibrom-coumarin-3-carboxylic acid chloride.

The hydrochloride salt of the product was obtained in a yield of 90% and has a melting point of 210° C. when recovered from 50% ethanol.

The base has a melting point of 132.5° C. when recovered from acetone.

*Example 14.—8-methoxy-coumarin-3-carboxylic-diethylamino ethanolester*

The product was prepared in accordance with the general method of prepartion described in Example 9, using di-ethylamino ethanol as the initial starting material for interaction with the 8-methoxy-coumarin-3-carboxylic acid chloride, the product of Example —.

The hydrochloride salt was obtained in a yield of 80% and has a melting point of 198° C. when recovered from ethanol.

*Example 15.—8-methoxy-coumarin-3-carboxylic-diethylamino propanol ester*

This product was prepared in accordance with the general method of preparation described in Example 9, using diethylamino propanol, $Et_2N.CH_2CH_2CH_2OH$ as the initial starting material for interaction with the 8-methoxy-coumarin-3-carboxylic acid chloride.

The hydrochloride salt was obtained in a yield of 65% and has a melting point of 181° C. when recovered from ethanol.

*Example 16.—8-methoxy-coumarin-3-carboxylic-dibenzylamino ethanolester*

This product was prepared in accordance with the general method of preparation described in Example 9, using dibenzylamino ethanol, $(C_6H_5.CH_2)_2CH_2CH_2OH$ as the initial starting material for interaction with the 8-methoxy-coumarin-3-carboxylic acid chloride.

The hydrochloride salt was obtained in a yield of 100% and has a melting point of 207.5° C. when recovered from chloroform and hexane. The base has a melting point of 127° C. when recovered from acetone.

*Example 17.—8-allyl-coumarin-3-carboxylic diethylamino ethanolester*

This product was prepared in accordance with the general method of preparation described in Example 9, using diethylamino ethanol as the initial starting material for interaction with the 8-allyl-coumarin-3-carboxylic acid chloride.

The hydrochloride salt was obtained in a yield of 62% and has a melting point of 168° C. when recovered from ethanol and ether.

*Example 18.—8-allyl-coumarin-3-carboxylic-diethylamino propanol ester*

This product was prepared in accordance with the general method of preparation described in Example 9, using diethylamino propanol, $Et_2N.CH_2CH_2CH_2OH$ as the initial starting material for interaction with the 8-allyl-coumarin-3-carboxylic acid chloride.

The hydrochloride salt was obtained in a yield of 62% and has a melting point of 153° C. when recovered from alcohol and ether.

Example 19.—8-allyl-coumarin-3-carboxylic-dibenzylamino ethanolester

This product was prepared in accordance with the general method of preparation described in Example 9, using dibenzylamino ethanol as the initial starting material for interaction with the 8-allyl-coumarin-3-carboxylic acid chloride.

The hydrochloride salt thereof was obtained in a yield of 72% and has a melting point of 174° C. when recovered from ethanol and ether.

Example 20.—6-nitro-coumarin-3-carboxylic diethylamino ethanolester

This product was prepared in accordance with the general method of preparation described in Example 9, using diethylamino ethanol as the initial starting material for interaction with the 6-nitro-coumarin-3-carboxylic acid.

The hydrochloride salt thereof was obtained in a yield of 81% and has a melting point of 207° C. when recovered from ethanol.

The base has a melting point of 122° C. when recovered from 50% ethanol.

Example 21. — 6-brom-coumarin-3-carboxylic acid diethyl amide 28.7 grams of 6-brom-coumarin-3-carboxylic acid chloride (0.1 mole) suspended in 100 cc. of dry benzene was slowly introduced with stirring and cooling to 14.6 grams (0.2 mole) of diethylamine, $Et_2NH_2$, in 50 cc. of dry benzene. The mixture was refluxed for four hours. The benzene was evaporated and the residue stirred with cold dilute hydrochloride acid and filtered on a Buchner funnel and washed with cold water.

The product was obtained in a yield of 70% (22.3 grams) and has a melting point of 161° C. when recovered from 95% ethanol.

Example 22. — 6-brom-coumarin-3-carboxylic acid allyl amide

This product was prepared in accordance with the general method of preparation described in Example 21, using allyl amine, $CH_2=CH.CH_2NH_2$ as the initial starting material for interaction with the 6-brom-coumarin-3-carboxylic acid chloride.

The product was obtained in a yield of 66% and has a melting point of 197° C. when recovered from ethanol.

Example 23.—6-brom-coumarin-3-carboxylic acid para ethoxy phenyl amide

This product was prepared in accordance with the general method of preparation described in Example 21 using para ethoxy aniline, $$p.C_2H_5O.C_6H_4NH_2$$

as the initial starting material for interaction with the 6-brom-coumarin-3-carboxylic acid chloride.

The product was obtained in a yield of 74% and has a melting point of 211° C. when recovered from toluene.

Example 24. — 6-brom-coumarin-3-carboxylic acid di-n.butyl amide

This product was prepared in accordance with the general method of preparation described in Example 21 using di-n.butyl amine, $(n.Bu)_2NH$, as the initial starting material for interaction with the 6-brom-coumarin-3-carboxylic acid chloride.

The product was obtained in a yield of 60% and has a melting point of 143° C. when recovered from ethanol and water.

Example 25. — 6-brom-coumarin-3-carboxylic acid dibenzyl amide

This product was prepared in accordance with the general method of preparation described in Example 21 using dibenzylamine, $(C_6H_5.CH_2)_2NH$ as the initial starting material for interaction with the coumarin-3-carboxylic acid chloride.

The product was obtained in a yield of 90% and has a melting point of 209° C. when recovered from dioxane and water.

Example 26.—6,8 di-brom-coumarin-3-carboxylic acid diethyl amide

This product was prepared in accordance with the general method of preparation described in Example 21 using diethylamine as the initial starting material for interaction with the 6,8 di-brom-coumarin-3-carboxylic acid chloride.

The product was obtained in a yield of 65% and has a melting point of 174° C. when recovered from ethanol.

Example 27. — 6,8 - di - brom - coumarin - 3-carboxylic acid di-n.butyl amide This product was prepared in accordance with the general method of preparation described in Example 21 using n.dibutylamine, $n.Bu_2.NH$, as the initial starting material for interaction with the 6,8 di-brom-coumarin-3-carboxylic acid chloride.

The product was obtained in a yield of 73% and has a melting point of 142° C. when recovered from ethanol and water.

Example 28. — 6,8 - di - brom - coumarin - 3-carboxylic acid dibenzylamide

This product was prepared in accordance with the general method of preparation described in Example 21 using dibenzylamine as the initial starting material for interaction with the 6,8 di-brom-coumarin-3-carboxylic acid chloride.

The product was obtained in a yield of 90% and has a melting point of 188.5° C. when recovered from dioxane and water.

Example 29.—8-allyl-coumarin-3-carboxylic acid diethyl amide

This product was prepared in accordance with the general method of preparation described in Example 21 using diethylamine as the initial starting material for interaction with the 8-allyl coumarin-3-carboxylic acid chloride.

The product was obtained in a yield of 71% and has a melting point of 92.5° C. when recovered from methanol.

Example 30. — 6 brom-coumarin-3-carboxylic acid morpholino ethanol ester

This product was prepared in accordance with the general procedure described in Example —,  using B morpholino ethanol, as the initial starting material for interaction with the 6 brom-coumarin-3-carboxylic acid chloride.

The hydrochloride salt thereof was obtained in a yield of 75% and has a melting point of 238° C. when recovered from alcohol and ether.

The base has a melting point of 133.5° C. when recovered from 50% acetone.

Example 31.—6-brom-coumarin-3-carboxylic acid-ethylester 40 grams of 5-bromo-salicylaldehyde and 32 grams (0.2 mole) of diethyl malonate were mixed with 1 cc. of piperidine. The mixture was heated in an open flask on the water bath at 70° C. for three hours. 50 cc. of cold methanol were added to the solidified mixture, the crystals were filtered on a Buchner funnel, washed with 10 cc. of cold methanol and dried in vacuum. The product was obtained in a yield of 50 grams (85%) and has a melting point of 170° C. when recovered from methanol.

*Example 32.—6-amino-coumarin-3-carboxylic acid*

11.75 grams (0.05 mole) of 6-nitro-coumarin-3-carboxylic acid (the product of Preparation 5), dissolved in 250 cc. of dioxane with 0.2 gram of 10% palladium-charcoal catalyst were hydrogenated with an initial pressure of 50 pounds. After two hours the theoretical amount of hydrogen was absorbed. The solution was filtered. There was then added to the solution 100 cc. of hexane which resulted in the precipitation of the 6-amino-coumarin-3-carboxylic acid as a yellow crystalline product. It was quickly filtered and washed with hexane and dried in vacuum. The yield was 9 grams (88%). The product has a melting point of 205° C. after several recrystallizations from benzol and hexane.

*Example 33.—8-allyl-coumarin-3-carboxylic acid chloride*

23 grams (0.1 mole) of 8-allyl-coumarin-3-carboxylic acid (the product of Preparation 4) were dissolved in 100 cc. of dry chloroform and 35 cc. of thionylchloride were slowly added thereto at room temperature. After all the thionylchloride was added the mixture was refluxed for two hours. The chloroform and the excess of thionylchloride were distilled in vacuum. The residual crystalline acid chloride was dried in a desiccator over phosphorus pentoxide. The yield of the final product was 24.8 grams (100%).

*Example 34.—6-diethylaminomethyl-8-methoxy-coumarin-3-carboxylic-acid*

11 grams of 8-methoxy coumarin carboxylic-acid (0.05 mol) are dissolved in a solution of 2 grams of sodium hydroxide in 50 cc. of water by gently heating to 40° C. (the solution being alkaline to phenolphthalein). The solution is then cooled in ice-water to 5° C., and, at that temperature, 3.65 grams of diethylamine and 4.5 grams of aqueous formaldehyde (37%) are added with stirring. The temperature is maintained at 5°–10° C. during the mixing and for one hour thereafter. Then the mixture is gently heated to 40–45° for one hour. The clear solution is then cooled to 10° C., and 10 cc. of hydrochloric acid are added (the solution being acid to Congo-red). On cooling in ice-water, the hydrochloride of the reaction product crystallizes rapidly. On recrystallization from 50% dioxan, the melting point remains at 207.50. The yield is 8.5 grams (50%).

*Analysis.*—Calculated for $C_{16}H_{19}O_5N \cdot HCl$: N—4.09%, Cl—10.37%. Found: N—3.86%, Cl—10.75%.

*Example 35.—6-diethylamino methyl-8-methoxy-coumarin-3-carboxylic-acid-methylester*

10 grams of 6-diethylamino methyl-8-methoxy-coumarin-3-carboxylic acid are dissolved in 250 cc. of methanol alcohol by heating under reflux. Dry hydrogen chloride is introduced into the boiling solution until saturation is complete. The flask is then closed and allowed to stand overnight at room temperature. The methanol is then evaporated under vacuum. The crystalline residue, the hydrochloride salt of the methyl ester (product of this example), thus obtained is recrystallized from 100 cc. of acetone and 25 cc. of water. It has a melting point of 217° C. Yield—8.4 grams (83%).

*Example 36.—6-piperidino methyl-8-methoxy-coumarin-3-carboxylic acid*

44 grams of 8-methoxy coumarin-3-carboxylic acid are dissolved in a solution of 8 grams of sodium hydroxide in 280 cc. of water (the solution being alkaline to phenolphthalein). The solution is cooled in ice-water to 5° C., at which temperature 20 grams of piperidine are added slowly with stirring, followed immediately thereafter by the addition of 24 grams of an aqueous solution of formaldehyde (37%). The temperature is maintained at 5–10° C. for one hour, and the mixture is then allowed to stand overnight at room temperature. The mixture is then cooled in ice-water and acidified with hydrochloric acid using Congo red as the indicator. On cooling in ice the hydrochloride of the new compound precipitates. When recrystallized from 1000 cc. of 5% hydrochloric acid, and washed with acetone, the M. P. is 236° C. The yield is 50 grams (72%).

*Analysis.*—Calculated for $C_{17}H_{19}O_5N \cdot HCl$: Cl—10.00%. Found: Cl—9.81%.

*Example 37.—6-piperidino methyl-8-methoxy-coumarin-3-carboxylic-acid-ethylester*

15 grams of 6-piperidino methyl-8-methoxy-coumarin-3-carboxylic acid are refluxed in 250 cc. of absolute ethanol, and dry hydrogen chloride introduced for one hour. The mixture then is cooled to 0° C., and salinated with dry hydrogen chloride. The flask is closed and allowed to stand overnight at room temperature. 750 cc. of ether are added, and the mixture is cooled in an ice salt bath. The hydrochloride of the ethylester of the product of this example precipitates. On recrystallization from 150 cc. of acetone and 40 cc. of water by adding ether, the M. P. was found to be 231° C. The yield is 15 grams (95%).

*Analysis.*—Calculated for $C_{19}H_{23}O_5N \cdot HCl$: Cl—9.30. Found: Cl—9.31.

*Example 38.—6-piperidino methyl-8-methoxy-coumarin-3-carboxylic acid-n. butylester*

15 grams of 6-piperidino methyl-8-methoxy-coumarin-3-carboxylic acid and 250 cc. of N-butanol are refluxed, and dry hydrogen chloride introduced into this boiling solution for one hour. The mixture is then cooled in an ice-salt bath and dry hydrochloric acid gas is introduced to complete the salination. The flask is closed and the mixture is allowed to stand overnight at room temperature. Then 750 cc. of ether are added. On cooling in ice the hydrochloride of the above butylester precipitates. The salt is recrystallized from 150 cc. of acetone and 25 cc. of water, by the addition of ether. It has a melting point of 216.50° C. The yield is 17 grams (90%).

*Analysis.*—Calculated for $C_{21}H_{27}O_5N \cdot HCl$: Cl—8.66%. Found: Cl—8.86%.

*Example 39.—6-piperidino methyl-8-methoxy-coumarin-3-carboxylic acid-diethylamino ethanol ester*

17.5 grams of 8-methoxy-coumarin-3-carboxylic acid-diethylamino ethanol ester hydrochloride are dissolved in a mixture of 300 cc. of dioxan and 50 cc. of water and then cooled to 5° C. Then 20 grams of anhydrous potassium carbonate, dissolved in 50 cc. of water are added at 5° C. and stirred well. The dioxan layer is separated, using a separatory funnel. After cooling to 5–10 C. 5 grams of piperidine and 6 grams of aqueous solution of formaldehyde (37%) are added with stirring. The mixture is allowed to stand for one hour at 5° C., and then for three days at room temperature. The mixture is then acidified with hydrochloric acid (Congo red as indicator) in ethanol, and 300 cc. of acetone are added. The mono-hydrochloride salt of the product of this example precipitates, and is recrystallized from 70% ethanol. It has a melting point of 215° C. The yield is 4.5 grams (20%).

*Analysis.*—Calculated for $C_{23}H_{32}O_5N_2.HCl$: Cl—7.85%. Found: Cl—8.16%.

*Example 40.—6-piperidino methyl-8-methoxy-coumarin-3-carboxylic acid-diethylamino propanol ester*

18.4 grams of 8-methoxy-coumarin-3-carboxylic-diethylamino propanol ester hydrochloride are dissolved in a mixture of 300 cc. of dioxan and 50 cc. of water, and cooled to 5° C. Then 20 grams of potassium carbonate in 50 cc. of water are added and stirred well. The dioxan layer is separated and cooled to 5° C. 5 grams of piperidine and 6 grams of an aqueous solution of formaldehyde (37%) are added with stirring. The mixture is allowed to stand for one hour at 5° C. and then for three days at room temperature. Hydrochloric acid in ethanol is added (until acid is Congo red). On adding 300 cc. of acetone, the mono-hydrochloride salt of the new compound of this example precipitates. It is recrystallized from 70% ethanol. It has a melting point of 225° C. Yield 10 gr. (42%).

*Analysis.*—Calculated for $C_{24}H_{34}O_5N_2.HCl$: Cl—7.60%. Found: C—7.68%.

*Example 41.—6-piperidino methyl-8-methoxy-coumarin-3-carboxylic acid-B-piperidino ethanol ester*

18.3 grams of 8-methoxy-coumarin-3-carboxylic acid-B-piperidino ethanol ester hydrochloride are dissolved in a mixture of 300 cc. of dioxan and 50 cc. of water. 20 grams of potassium carbonate in 50 cc. of water at 5° C. are added. The mixture is stirred well, and the dioxan layer is then separated and cooled to 5° C. To this solution there are added 5 grams of piperidine and 6 grams of an aqueous solution of formaldehyde (37%) with stirring. The mixture is allowed to stand for one hour at 5–10° C., and then for three days at room temperature. Hydrochloric acid in ethanol is added (until acid is Congo red). On adding 300 cc. of acetone the mono-hydrochloride salt of the new compound of this example precipitates. It is recrystallized twice from 70% ethanol. It has a melting point of 212° C. Yield—4.6 grams (20%).

*Analysis.*—Calculated for $C_{24}H_{32}O_5N_2.HCl$: Cl—7.64%. Found: Cl—7.84%.

We claim:

1. Method of preparing 6-nitro-coumarin-3-carboxylic acid which comprises mixing cold fuming nitric acid with coumarin-3-carboxylic acid; allowing said mixture to stand at room temperature; then heating the mixture for a period of about 30 minutes at about 80° C.; and recovering the 6-nitro-coumarin-3-carboxylic acid thus formed from said mixture.

2. Method of preparing 6-nitro-coumarin-3-carboxylic acid which comprises mixing cold fuming nitric acid with coumarin-3-carboxylic acid; allowing said mixture to stand at room temperature for about 2 hours; then heating the mixture for a period of about 30 minutes at about 80° C.; then cooling said mixture and adding cold water thereto to precipitate the 6-nitro-coumarin-3-carboxylic acid.

References Cited in the file of this patent

UNITED STATES PATENTS

| Number | Name | Date |
|---|---|---|
| 2,094,000 | Dalmer | Sept. 28, 1937 |
| 2,133,977 | Dalmer | Oct. 25, 1938 |
| 2,170,127 | Dalmer | Aug. 22, 1939 |
| 2,318,894 | Smith | May 11, 1943 |

OTHER REFERENCES

Fedosova et al., "Zhur. Obshchei Khim" (Aug. 1948) 18, pp. 1459–66 (Chem. Abst., 1949, vol. 43, p. 2180).

Perkin, Chemical Abstracts, vol. IX (1915), p. 199.

Clinton, J. Amer. Chem. Soc., Nov. 1949, pp. 3602–6.